(12) United States Patent
Katsuragi (10) Patent No.: US 12,207,142 B2
(45) Date of Patent: Jan. 21, 2025

(54) BASE STATION, CONTROL METHOD, AND STORAGE MEDIUM

(71) Applicant: Canon Kabushiki Kaisha, Tokyo (JP)

(72) Inventor: Tetsuya Katsuragi, Toyko (JP)

(73) Assignee: Canon Kabushiki Kaisha, Tokyo (JP)

( * ) Notice: Subject to any disclaimer, the term of this patent is extended or adjusted under 35 U.S.C. 154(b) by 393 days.

(21) Appl. No.: 17/542,656

(22) Filed: Dec. 6, 2021

(65) Prior Publication Data

US 2022/0182907 A1 Jun. 9, 2022

(30) Foreign Application Priority Data

Dec. 7, 2020 (JP) ................................ 2020-202899

(51) Int. Cl.
*H04W 36/00* (2009.01)
*H04W 36/14* (2009.01)

(52) U.S. Cl.
CPC ..... *H04W 36/0016* (2013.01); *H04W 36/142* (2023.05)

(58) Field of Classification Search
CPC ........................ H04W 36/14; H04W 36/0016
See application file for complete search history.

(56) References Cited

U.S. PATENT DOCUMENTS

| 2017/0311245 | A1 | 10/2017 | Kuge et al. |
| 2019/0289650 | A1* | 9/2019 | Yoo ...................... H04W 48/18 |
| 2020/0322858 | A1* | 10/2020 | Liu ................... H04W 36/0022 |

FOREIGN PATENT DOCUMENTS

| CN | 111586797 A | 8/2020 | |
| JP | 2017518006 A | 6/2017 | |
| JP | 2020053993 A | 4/2020 | |
| JP | 2021528023 A | 10/2021 | |
| WO | WO-2020200293 A1 * | 10/2020 | ........ H04W 36/0011 |
| WO | WO-2023011087 A1 * | 2/2023 | ............ H04W 36/00 |

OTHER PUBLICATIONS

Japanese Office Action dated Aug. 5, 2024 in counterpart Japanese Patent Appln. No. 2020-202899.

* cited by examiner

*Primary Examiner* — Shukri Taha
(74) *Attorney, Agent, or Firm* — Venable LLP (57) ABSTRACT

A base station of a mobile communication system is provided. The base station receives, from a control apparatus, an instruction for switching a core network based on a communication that a terminal connected to the base station is to perform, and changes, based on the received instruction, a core network to which to connect from a currently connected first core network to a second core network that is different from the first core network.

10 Claims, 4 Drawing Sheets

BASE STATION, CONTROL METHOD, AND STORAGE MEDIUM

BACKGROUND OF THE INVENTION

Field of the Invention

The present invention relates to a network operation control technique.

Description of the Related Art

Based on the 5th generation (5G) mobile communication standard established by the 3rd Generation Partnership Project (3GPP), utilization of a local 5G in which enterprises, local governments, and the like build communication environments in independent business networks is expected. In local 5G, for example, in an enclosed environment, such as factory premises, it is possible to implement only the functions of the core network and to implement so as to not communicate externally to the core network. By this, it is possible to ensure the required communication performance and security and realize Ultra-Reliable and Low Latency Communications (URLLC).

A situation may occur in which a communication device accommodated in a local 5G network performs high-speed, large-capacity communication with another apparatus arranged in an external network. For example, industrial robots may need to communicate with manufacturers' servers outside of the factory where the local 5G network is configured to repair a fault or update firmware. In relation to this, it is possible to connect the communication device to another apparatus arranged in an external network by a base station connected to the communication device switching the core network to which to connect an external core network. Japanese Patent Laid-Open No. 2020-053993 describes switching the core network to which to connect based on a property of the terminal.

In the technique described in Japanese Patent Laid-Open No. 2020-053993, since the core network to which to connect is changed based on the property of the terminal, it is impossible to switch the core network in a state in which there is no change in the property of a terminal for which maintenance is necessary, for example.

SUMMARY OF THE INVENTION

The present invention provides a technique for enabling a base station to flexibly switch a core network to which to connect.

According to one aspect of the present invention, there is provided a base station of a mobile communication system, comprising: one or more processors; and one or more memories that store computer-readable instructions, which cause, when executed by the one or more processors, the base station to: receive, from a control apparatus, an instruction for switching a core network based on a communication that a terminal connected to the base station is to perform; and change, based on the received instruction, a core network to which to connect from a currently connected first core network to a second core network that is different from the first core network.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

(System Configuration Example)

Figure 1:
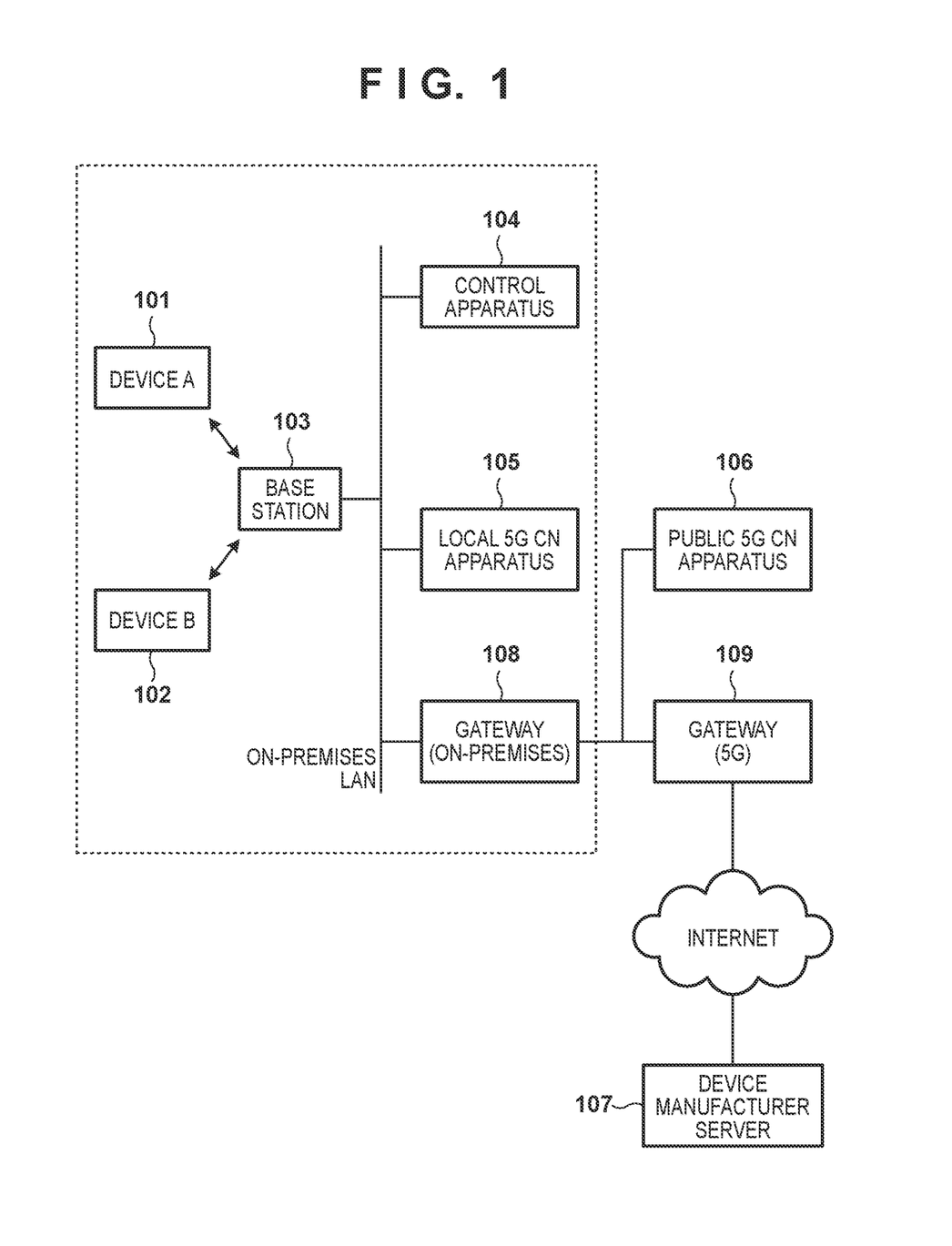
FIG. 1 is a view illustrating a configuration example of a communication system.

FIG. 1 illustrates a configuration example of a communication system according to the present embodiment. In the present system, a local 5G network is constructed in accordance with the fifth generation (5G) wireless communication standard established by the Third Generation Partnership Project (3GPP), for example, in a limited area such as a factory. In this system, a local 5G network is constructed using a local area network (LAN) in the premises. The system, for example, is constructed for operation of robots in the factory and the like, and includes a device A 101 and a device B 102 configured to include a terminal that performs 5G wireless communication mounted on the robot. The device A 101 and the device B 102 are connected to a base station 103 which is an access node which provides wireless access for the local 5G network installed in the premises, and performs wireless communication. Note, the wireless communication between the device A 101 and the device B 102 and the base station 103 is executed in accordance with the 5G wireless communication standard. Note that wireless communication in accordance with 5G wireless communication standards is not described here.

The base station 103 is connected to a local 5G CN apparatus 105 via a LAN in the premise. Note, CN means core network. The local 5G CN apparatus 105 provides a core network function to provide Ultra-Reliable and Low Latency Communications (URLLC) for synchronous communication of devices such as the device A 101 and the device B 102 in the premises. A control apparatus 104 controls the device A 101 and the device B 102 and the base station 103. The control apparatus 104 according to the present embodiment executes, for example, control for changing the core network to which to connect the base station 103 and the like. Note, the device A 101 and the device B 102 can communicate only within the range of the LAN in the premises while under management of the local 5G CN apparatus 105, and the device A 101 and the device B 102 are configured so that they cannot be connected to an external network, through a gateway 108, for example. Note that the device A 101 and the device B 102 are configured to be connectable only to the base station 103, for example, and are configured not to be connected to other base stations installed outside the premises, for example. In one example, it is assumed that the device A 101 and the device B 102 are connected to the same base station 103 in cases where they are connected to the local 5G or public 5G. Note, the device A 101 and the device B 102 may include, for example, a SIM for local 5G (Subscriber Identity Module) and a SIM for public 5G, and may be configured so as to use the SIM according to the network to which to connect.

On the other hand, the base station 103 can be connected to an external public 5G CN apparatus 106 via an on-premises LAN and an on-premises gateway 108. The public 5G CN apparatus 106 provides the core network functions for the mobile communication network provided by a telecommunications carrier. The base station 103 is configured to be able to connect to additional external networks, such as the Internet, via a gateway 109 under the control of the public 5G CN apparatus 106. As a result, the base station 103, the device A 101, and the device B 102 can communicate with various other communication devices such as a server 107 of a device manufacturer, which can be accessed via the Internet. The server 107 of the device manufacturer is a server used by the device manufacturer who manufactures the device A 101 for maintenance of the device, for example. The gateway 108 is a gateway device that connects a LAN on the premises to an external network, and is used, for example, when connecting to the on-premises LAN to a network of a telecommunications carrier providing a public 5G mobile communication system. The gateway 109 is a gateway device that connects the network of the telecommunications carrier, which provides the public 5G mobile communication system, to an external network such as the Internet.

Note, the device A 101 and the device B 102 may be configured so as not to be able to communicate with external apparatuses such as the server 107 while the base station 103 is connected to the local 5G CN apparatus 105. That is, while communication is being performed on the local 5G, the connection between the on-premises LAN and the external network is blocked, and by limiting the communication in the on-premises LAN, it is possible to realize Ultra-Reliable and Low Latency Communications (URLLC) without being affected by the communication with the external network. On the other hand, in a case where the device A 101 or the device B 102 needs to communicate with another external apparatus such as the server 107, URLLC for limiting the premises is stopped so as to communicate with the external apparatus under the control of the public 5G CN apparatus 106.

In the present embodiment, for example, the control apparatus 104 determines to change the core network apparatus to which to connect the base station 103 to the public 5G CN apparatus 106 in a situation where the device A 101 or the device B 102 is communicating under the control of the local 5G CN apparatus 105. The control apparatus 104 makes such a determination to connect these devices to the server 107 of the device manufacturer connected to the external network, for example, in response to the determination that maintenance in at least one of the device A 101 and the device B 102 is required. Also, the control apparatus 104 may decide to change the core network apparatus to which to connect the base station 103 to the local 5G CN apparatus 105 in a situation where the device A 101 or the device B 102 is communicating under the control of the public 5G CN apparatus 106. For example, such a determination is made in response to a situation in which the device A 101 and the device B 102 do not need to be connected to the external network due to the end of maintenance or the like. It should be noted that the maintenance is merely an example, and the switching of the connection between the local 5G and the public 5G may be determined based on various circumstances. Then, the control apparatus 104 transmits a trigger message to the device A 101, the device B 102, and the base station 103 to cause the core network to which to connect to switch. The base station 103 executes processing for switching the CN apparatus to which to connect accordingly. In addition, the device A 101 and the device B 102 can switch SIMs in order to switch the core network to which to connect. Thereby, it is possible to flexibly change the core network to which to connect the base station 103 based on the content of the communication to be executed by the terminal in a situation where the property of the terminal in the device A 101 or the device B 102 does not change.

Note, the configuration of FIG. 1 is only one example, and another configuration may be used. For example, although the local 5G CN apparatus 105 and the public 5G CN apparatus 106 are illustrated as single apparatuses, they may be executed by a plurality of servers or the like, each of which implements a part of the group of functions of the core network. Further, a plurality of base stations may be arranged in the premises, and the base stations may be configured to be interconnectable via the on-premises LAN. Note, the control apparatus 104 may control the core network to which a plurality of base stations are connected to be switched collectively, or may switch the core network to which to connect only for a base station connected to a predetermined terminal, for example.

Hereinafter, an example of the configuration of each apparatus as described above will be described, and an example of the flow of operations in the system will be described.

(Apparatus Configuration)

Figure 2:
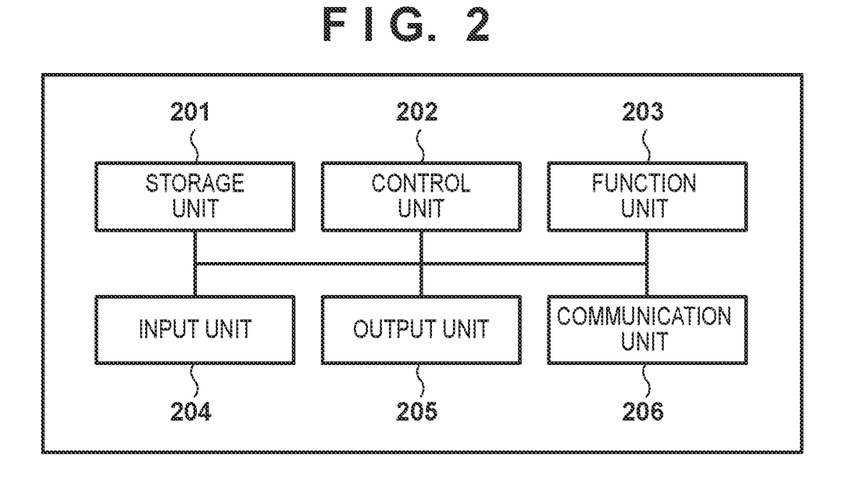
FIG. 2 is a view illustrating an example of a hardware configuration of each apparatus.

FIG. 2 illustrates an example of a hardware configuration of each apparatus according to the present embodiment (the device A 101, the device B 102, the base station 103, the control apparatus 104, the local 5G CN apparatus 105, and the public 5G CN apparatus 106). Each apparatus includes, for example, a storage unit 201, a control unit 202, a function unit 203, an input unit 204, an output unit 205, and a communication unit 206. Note, the configuration of FIG. 2 is only one example, and each apparatus may include a configuration not illustrated in FIG. 2, such as unique hardware, and at least some of the configurations of FIG. 2 may be replaced with equivalent configurations.

The storage unit 201 is configured to include one or more memories such as a ROM and a RAM, for example, and stores a computer program for performing various operations to be described later, and various kinds of information such as communication parameters for communication (wireless communication and wired communication). Note, the ROM is an acronym for Read Only Memory and the RAM is an acronym for Random Access Memory. Note, in addition to or in place of a memory such as a ROM or a RAM, the storage unit 201 may include a storage medium such as a flexible disk, a hard disk, an optical disk, a magnetic optical disk, a CD-ROM, CD-R, a magnetic tape, a nonvolatile memory card, a DVD, or the like. The storage unit 201 may include a plurality of memories or the like.

The control unit 202 is configured by one or more processors such as a CPU and an MPU, for example, and controls the entire apparatus by executing a computer program stored in the storage unit 201. Note, CPU is an acronym for Central Processing Unit and MPU is an acronym for Micro Processing Unit. In addition to the overall control of the apparatus, the control unit 202 may be configured to executing processing to generate data and signals for transmission in communication with other apparatuses. Note that the control unit 202 may be configured to execute processes such as control of the entire apparatus by, for example, cooperation between computer programs stored in the storage unit 201 and OS (Operating System). The control unit 202 may include a plurality of processors such as with a multi-core, and may be configured to execute processing such as control of the entire apparatus by the plurality of processors.

Further, the control unit 202 controls the function unit 203 to execute a predetermined process such as image capturing, printing, or projection. The function unit 203 is hardware by which the apparatus executes predetermined processing. For example, in a case where the device A 101 or the device B 102 is a sensor such as a camera, the function unit 203 is an image capturing unit and may execute image capture processing. Further, in a case where the device A 101 or the device B 102 is an actuator, the function unit 203 is an operation control unit for causing a machine to operate and may execute operation control of a motor or the like. For another apparatus, the function unit 203 may be provided to perform a specific function in the apparatus. Data processed by the function unit 203 may be data stored in the storage unit 201, or may be data communicated with another apparatus via the communication unit 206 described later.

The input unit 204 is configured to include an apparatus for accepting various operations from a user. The output unit 205 is configured to include an apparatus for outputting various operations to a user. Here, output by the output unit 205 includes, for example, at least one of a display on a screen, audio output by a speaker, vibration output, and the like. Note, both the input unit 204 and the output unit 205 may be realized by one module as in the case of a touch panel. Also, the input unit 204 and the output unit 205 may each be built into the apparatus or may be configured as external apparatuses connected to the apparatus.

The communication unit 206 includes various communication interfaces for wireless communication and wired communication, and a control circuit for controlling wireless communication/wired communication and controlling IP communication. In the present embodiment, the communication unit 206 of the device A 101 and the device B 102 and the base station 103, in particular, in order to perform control of wireless communication conforming to the 5G mobile communication standard, includes an antenna, a radio frequency (RF) circuit, a baseband circuit, and the like. The communication unit 206 of the base station 103, the local 5G CN apparatus 105, and the public 5G CN apparatus 106 include, for example, a wired communication interface for wired communication and a control circuit for establishing an interface conforming to the standard of the 5G core network to perform communication. The communication unit 206 of the control apparatus 104 may include a wired communication interface and its control circuit for communicating with the base station 103 via the on-premises LAN.

Note, the communication unit 206 of the device A 101 and the device B 102 and the base station 103 controls the antenna (not shown), for example, and transmits and receives signals for wireless communication generated by the control unit 202. Incidentally, the antenna may be prepared separately from the communication unit 206, and it may be configured as one module combined with the communication unit 206. The control of the wireless communication based on the mobile communication standard may be performed by the control unit 202 or may be performed by the communication unit 206. The antenna is configured to output electromagnetic waves or to capture electromagnetic waves in a frequency band where use by a mobile communication network is permitted. Note, an antenna corresponding to each frequency band may be provided for each usable frequency band, and configuration may be taken such that communication by one antenna in a plurality of frequency bands can be executed by using a multiband antenna. Also, a plurality of antennas for communication in the same frequency band may be provided in order to enable MIMO (Multiple Input Multiple Output) communication.

Figure 3:
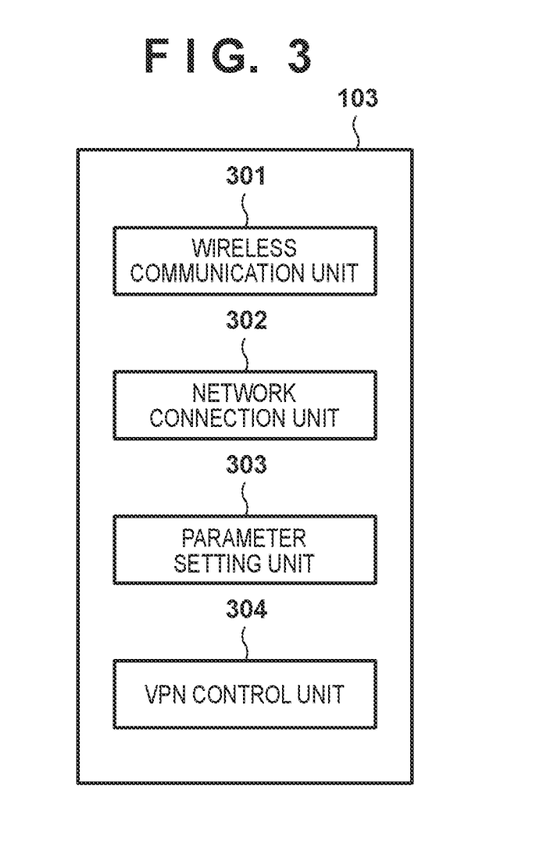
FIG. 3 is a view illustrating an example of a functional configuration of a base station.

FIG. 3 illustrates an example of the functional configuration of the base station 103. Each of the functions of FIG. 3 can be realized by, for example, the control unit 202 of the base station 103 executing a program stored in the storage unit 201. Note, at least some of the functions may be realized by dedicated hardware such as an ASIC (application specific integrated circuit). Also, FIG. 3 illustrates only the functional configuration relating to the function unit that executes the processing according to the present embodiment, and the base station 103 naturally has general functions as a base station in a mobile communication network. Also, the functional configuration of FIG. 3 is merely an example, and other functions may be implemented in addition to the functions illustrated in FIG. 3, and at least some of the functions illustrated in FIG. 3 may be replaced with other function units performing similar functions. The base station 103 includes, for example, a wireless communication unit 301, a network connection unit 302, a parameter setting unit 303, and a VPN control unit 304 as the functional configuration.

The wireless communication unit 301 executes a process for operating as a base station of a 5G mobile communication system. Note, although the wireless communication unit 301 operates as a base station that conforms to the 5G wireless communication standard established by 3GPP, a detailed description is as described in the standard, and therefore, the specific operation will not be described here. The network connection unit 302 executes control for connecting and communicating with the control apparatus 104 or the local 5G CN apparatus 105 via the on-premises LAN. In addition, the network connection unit 302 can execute control for connecting to and communicating with another apparatus (public 5G CN apparatus 106 or the server 107 of the device manufacturer) arranged in an external network via the gateway 108.

The parameter setting unit 303 sets parameters to be used in the communication of the terminals (the device A 101 and the device B 102) in accordance with the connected core network. The parameters may include, for example, a communication scheme. In one example, the parameter setting unit 303 holds parameters such as different communication methods or usable frequency bands depending on the communication method in a case where the device A 101 and the device B 102 communicate over local 5G and in a case where the device A 101 and the device B 102 communicate over public 5G. The parameter setting unit 303 may output an instruction to the device A 101 and the device B 102 to change the communication parameters to be used, depending on whether the connection is to the local 5G or to the public 5G. Note, parameters common to the local 5G and the public 5G may be used.

The VPN control unit 304 executes control for performing a VPN (Virtual Private Network) connection when communicating with another device. For example, when connecting to an external network through the gateway 108, the VPN control unit 304 establishes a VPN connection so that communication can be performed. In one example, the VPN control unit 304 establishes a VPN connection when establishing a connection with the public 5G CN apparatus 106. Also, the VPN control unit 304 may establish a VPN connection when connecting to another apparatus such as the server 107 of the device manufacturer via the Internet, for example. Note, configuration may be taken such that the VPN control unit 304 establishes the VPN connection only when a particular preset apparatus such as the public 5G CN apparatus 106 is connected, for example.

Figure 4:
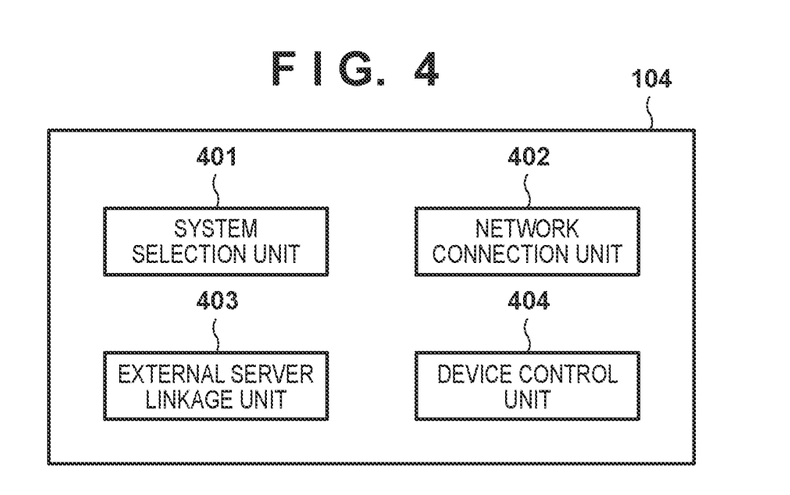
FIG. 4 is a view illustrating an example of a functional configuration of a control apparatus.

FIG. 4 illustrates an example of the functional configuration of the control apparatus 104. Each of the functions of FIG. 4 can be realized by, for example, the control unit 202 of the control apparatus 104 executing a program stored in the storage unit 201. Note, at least some of the functions may be realized by dedicated hardware such as an ASIC (application specific integrated circuit). In addition, FIG. 4 illustrates only a functional configuration relating to a function unit that executes processing according to the present embodiment, and the control apparatus 104 may have other functions. Also, the functional configuration of FIG. 4 is merely an example, and other functions may be implemented in addition to the functions illustrated in FIG. 4, or at least some of the functions illustrated in FIG. 4 may be replaced with other function units performing similar functions. The control apparatus 104 has, for example, a system selection unit 401, a network connection unit 402, an external server linkage unit 403, and a device control unit 404 as its functional configuration.

The system selection unit 401 specifies the state of the device A 101 and the device B 102, and determines whether the base station 103 should be connected to the local 5G or the public 5G based on the specified information. The network connection unit 402 executes control for connecting and communicating with an apparatus such as the base station 103 via the on-premises LAN. In addition, the network connection unit 402 can execute control for connecting to and communicating with another apparatus (for example, the server 107 of the device manufacturer) arranged in an external network via the gateway 108. The external server linkage unit 403 executes a process of linking with an external server such as the server 107 for maintenance by the device manufacturer. Note, in a case where the linking with the external server such as for maintenance of the device A 101 or the device B 102 is not performed, the external server linkage unit 403 may be omitted. The device control unit 404 controls the devices, such as in a sequence of a linking operation of the device A 101 or the device B 102.

Figure 5:
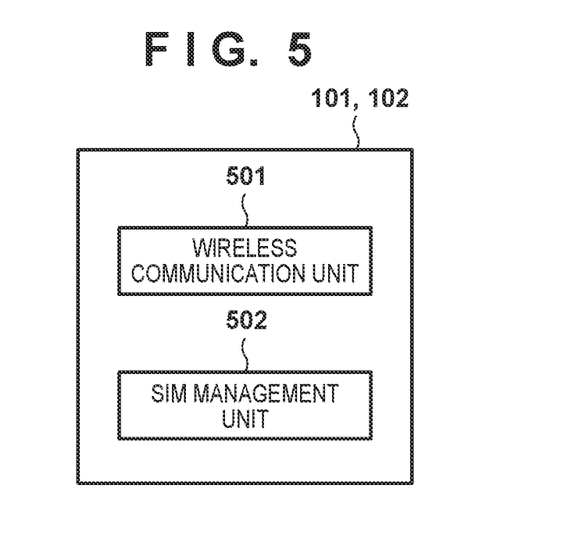
FIG. 5 is a view illustrating an example of a functional configuration of a terminal.

FIG. 5 illustrates an exemplary functional configuration of the device A 101 and the device B 102. Each of the functions of FIG. 5 can be realized by, for example, the control unit 202 of the device A 101 and the device B 102 executing a program stored in the storage unit 201. Note, at least some of the functions may be realized by dedicated hardware such as an ASIC (application specific integrated circuit). Also, FIG. 5 illustrates only the functional configuration relating to function units that execute the processing according to the present embodiment, and the device A 101 and the device B 102 naturally have general functions as terminals in a mobile communication network. Also, the functional configuration of FIG. 5 is merely an example, and other functions may be implemented in addition to the functions illustrated in FIG. 5, or at least some of the functions illustrated in FIG. 5 may be replaced with other function units performing similar functions. The device A 101 and the device B 102 include, for example, a wireless communication unit 501 and a SIM management unit 502 as their functional configurations.

The wireless communication unit 501 executes a process for operating as a terminal of a 5G mobile communication system. Note, although the wireless communication unit 501 operates as a terminal that conforms to the 5G wireless communication standard established by 3GPP, details are as described in the standard, and therefore, the specific operation will not be described here. The SIM management unit 502 manages the SIM used at a time of communication by the wireless communication unit 501. The wireless communication unit 501 can be configured to behave as a terminal of a different category depending on the SIM used, for example. The wireless communication unit 501 is configured to hold parameters notified from the base station 103 and perform wireless communication using the parameters.

The local 5G CN apparatus 105 and the public 5G CN apparatus 106 have common core network functions such as, for example, AMF (Access and Mobility Management Functions), SMF (Session Management Functions), and UPF (User Plane Functions). Since the functions that the core network should have are as specified in the standards established by 3GPP, the description here is omitted.

(Processing Flow)

Figure 6:
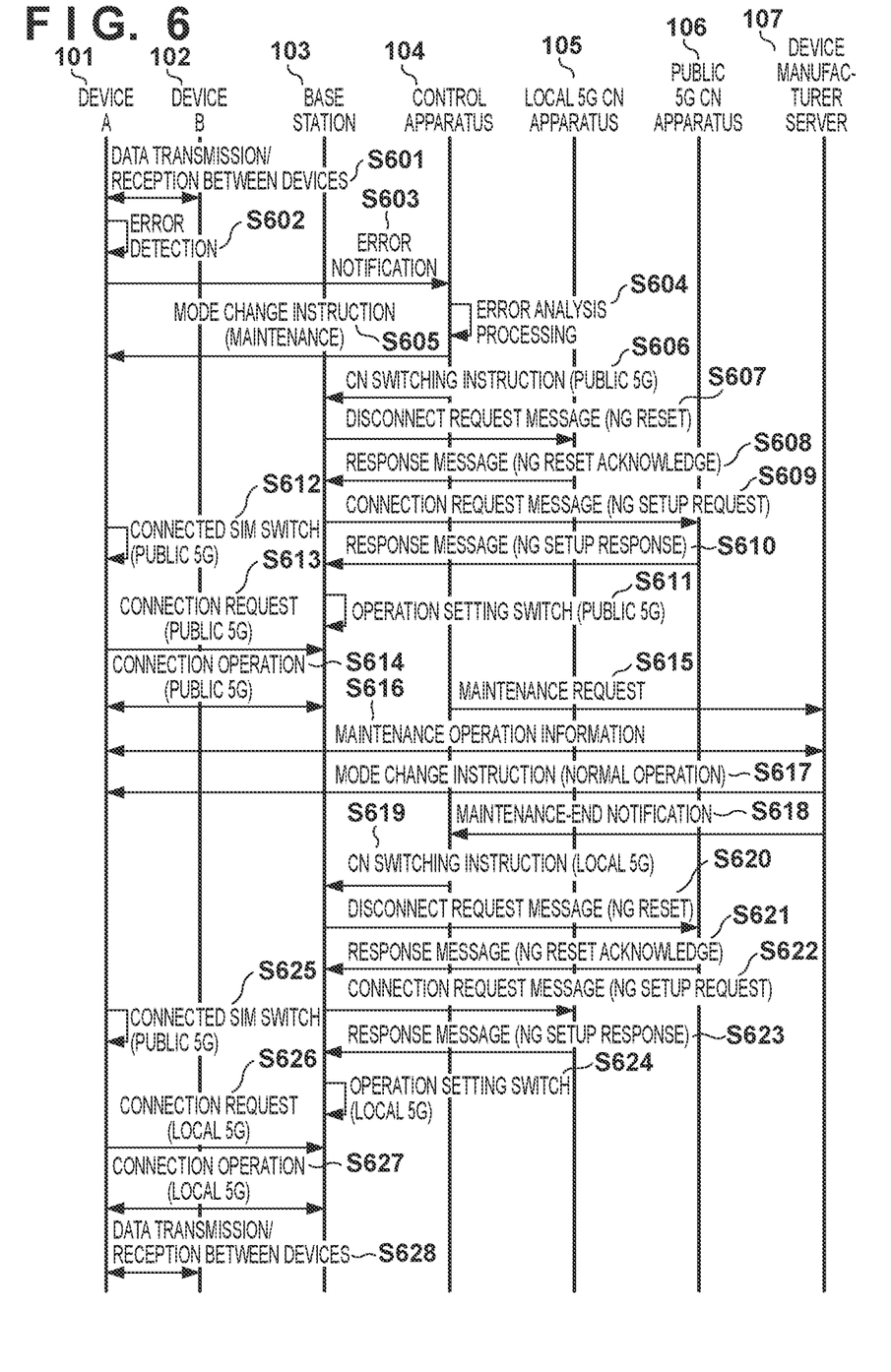
FIG. 6 is a view illustrating a flow of processing executed in a communication system.

Next, an example of the flow of processing executed in the system of FIG. 1 is described with reference to FIG. 6. Note, this process can be realized by, for example, the control unit 202 of each apparatus executing a program stored in the storage unit 201.

This process example describes a case in which a failure caused by an operation program or the like occurs when the device A 101 is connected to the mobile communication system of the local 5G and is communicating, and maintenance involving communication with the server 107 for maintenance by the device manufacturer is necessary. In this case, the device A 101 is connected to the mobile communication system of the public 5G to establish the connection between the device A 101 and the server 107 for maintenance of the device manufacturer which is located on the Internet. Accordingly, the core network to which to connect the base station 103 is switched from the core network of the local 5G to the core network of the public 5G. Also, after the maintenance of the device A 101 is completed, the operation of the device A 101 is returned to normal operation by switching the connection destination of the device A 101 from the mobile communication system of the public 5G to the mobile communication system of the local 5G.

In this process, in order for the device A 101 and the device B 102 to operate in a cooperative manner with each other, data is transmitted and received by direct communication between the terminals based on control of the base station 103 or by communication via the base station 103, for example (step S601). At this time, it is assumed that the device A 101 detects that an error has occurred in the apparatus itself (step S602), for example, and notifies the control apparatus 104 of the error via the base station 103 (step S603). Note, the device A 101 may detect that an error has occurred in the cooperation with the device B 102, for example, and may notify the control apparatus 104 of the error. In this case, in the following example, an example in which the maintenance of the device A 101 is executed is described, but the maintenance of the device B 102 may also be performed in parallel. The control apparatus 104 may analyze the type of error based on messages received from the device A 101 (step S604). For example, the control apparatus 104 determines whether or not the notified error is an error that requires maintenance of the device A 101 or the device B 102 by the server 107 of the device manufacturer. For example, if the notified error is not an error recoverable by the server 107 of the device manufacturer, such as a physical failure of the device A 101 or the device B 102, the control apparatus 104 may notify the user of the type of the error via the output unit 205, for example. On the other hand, in response to determining that the type of error is an error recoverable by the server 107 of the device manufacturer, the control apparatus 104 executes control for enabling the device A 101 and the device B 102 to communicate with the server 107. In this process example, the control apparatus 104 determines that an error has occurred in the device A 101 for which recovery by the server 107 of the device manufacturer is possible, and connects the device A 101 to the network of the public 5G to communicate with the server 107.

In the process for connecting the device A 101 to the network of the public 5G, first, the control apparatus 104 instructs the device A 101 to change mode to a maintenance mode (step S605). At this time, the control apparatus 104 may transmit a similar mode-change instruction to the device B 102 as required, for example. The control apparatus 104 transmits a message indicating that the core network should be switched to the public 5G to the base station 103 (step S606). By this, the device A 101 and the base station 103 can then recognize that the core network to which to connect should be switched from the local 5G to the public 5G. Note, at a time of the notification in step S605 and step S606, information that can distinguish the core network is included in the message. That is, information that allows the device A 101 to identify the SIM to be used and allows the base station 103 to identify the core network to which to connect may be included in the transmitted message. The notified information may include, for example, an IMSI (International Mobile Subscriber Identity). For example, an IMSI includes a PLMN (Public Land Mobile Network) number. Also, a PLMN number consists of an MCC (Mobile Country Code) and an MNC (Mobile Network Code). Among this information, it is possible to determine whether or not the network is the public 5G provided by a telecommunications carrier based on, for example, the MNC. Note that the determination may be made by combining MCCs and MNCs (PLMN numbers). In one example, the control apparatus 104 may notify the device A 101 or the base station 103 of a message instructing the switching of the core network by including a PLMN number instead of an IMSI. Note, for example, the control apparatus 104 may simultaneously transmit, to a plurality of base stations, information by which a terminal can be specified such as an IMSI. Configuration may be such that in this case, switching the core network is executed at the base station to which the terminal specified by the information is connected, and such switching is not executed at other base stations.

The device A 101 executes a switch to the SIM of the public 5G in response to receiving a mode change instruction message to switch to the public 5G (step S612). Note, prior to the switching of the SIM, the device A 101 may execute a process of disconnecting from the base station 103. Also, the device B 102 may disconnect from the base station 103 at this time because the base station 103 connects to the core network of the public 5G even when there is no need to connect to the public 5G. At this time, in a case where the device B 102 also received a mode change instruction message, the SIM of the device B 102 can also be switched. The base station 103 executes a process for switching the CN apparatus to which to connect the public 5G CN apparatus 106 in response to receiving an instruction for switching the core network to the public 5G. In this process, first, the base station 103 transmits a message (NG RESET message) requesting disconnection from the local 5G CN apparatus 105 (step S607). The local 5G CN apparatus 105 transmits a response message (NG RESET ACKNOWLEDGE message) to the request for disconnection from the base station 103 (step S608). As a result, the connection between the base station 103 and the local 5G CN apparatus 105 is disconnected. The base station 103 transmits a message (NG SETUP REQUEST message) requesting establishment of a connection to the public 5G CN apparatus 106 (step S609). Then, the public 5G CN apparatus 106 transmits a response message (NG SETUP RESPONSE message) for authorizing establishment of the connection to the base station 103 (step S610). When the base station 103 receives a message from the public 5G CN apparatus 106 in step S610, for example, it executes the connection setting with the public 5G CN apparatus 106 using the information included in the received message (step S611). Note that, at this time, the base station 103 sets parameters for wireless communication such as a communication method based on, for example, the received information. By this, a connection between the base station 103 and the public 5G CN apparatus 106 is established and the base station 103 is ready to communicate with the device A 101 on the public 5G. Note, since the content of the message of step S607 to step S610 is as specified in the standard established by 3GPP, the description here is omitted.

After this, the device A 101 which has switched to the SIM corresponding to the public 5G executes a process for connecting to the base station 103 (step S613 and step S614). For example, after the switching of the SIMs, in response to having received a synchronization signal and system information from the base station 103 operating as a base station of the public 5G, the device A 101 actively starts a random access procedure with the base station 103 and establishes a connection. Note, the base station 103 may initiate a random access procedure to the device A 101 by transmitting a paging channel to the device A 101. In a case where maintenance is also performed on the device B 102, a connection is established between the device B 102 and the base station 103 in the same manner.

The control apparatus 104, in parallel with or after the switching of the core network to which to connect by the base station 103, makes a request for maintenance to the server 107 of the device manufacturer via the gateway 108 and the gateway 109 (step S615). Note that at this time, the control apparatus 104 can notify the server 107 of the device manufacturer of the content of the errors analyzed in step S604. In FIG. 6, although an example of a case where a message for requesting maintenance is transmitted from the control apparatus 104 is illustrated, this message may be transmitted from the device A 101 after a connection to the base station 103 is established in step S614. Next, maintenance operation information is transmitted and received (step S616) between the device A 101 and the server 107 of the device manufacturer, and, for example, firmware in the device A 101 is updated and the like, thereby resolving the error. Note, the maintenance work may be such that, for example, the server 107 of the device manufacturer presents the work to be executed to the user of the device A 101, and the user performs a predetermined work based on the presented information. In a case where maintenance is also performed for the device B 102, the same communication is executed between the device B 102 and the server 107 of the device manufacturer.

After the maintenance is completed, the server 107 of the device manufacturer transmits a message to the device A 101 instructing a change to the normal mode (the mode for communicating with the local 5G) (step S617). In addition, the server 107 of the device manufacturer may notify the control apparatus 104 of the end of the maintenance (step S618). Note, in the example described above, although an example in which the server 107 transmits the mode change instruction to the device A 101 is illustrated, the control apparatus 104 may transmit the mode change instruction to the device A 101 in response to the reception of a maintenance-end notification, for example. However, if the control apparatus 104 is configured so as to be able to communicate only with the device A 101 on the local 5G and the device A 101 is configured so as not to be able to communicate while connected to the public 5G, the maintenance-end notification needs to be notified from the server 107. Note, the mode change instruction includes information that allows the device A 101 to identify the SIM corresponding to the local 5G. This information may be, for example, an IMSI or a PLMN number. The device A 101 switches the SIM to be used to the SIM for the local 5G (step S625), for example, in response to receiving the mode change instruction. Note, prior to the switching of the SIM, the device A 101 may execute a process of disconnecting from the base station 103. In a case where maintenance will also be performed on the device B 102, a mode change instruction is also transmitted to the device B 102, and the device B 102 disconnects from the base station 103 and switches the SIM to be used to the SIM for the local 5G.

Upon receiving the maintenance-end notification, the control apparatus 104 changes the core network to which to connect the base station 103 from the public 5G to the local 5G. The control apparatus 104 transmits to the base station 103 a message indicating that the core network should be switched to the local 5G (step S619). The message may include, for example, information, such as an IMSI or a PLMN number, which may identify the network of the local 5G. The base station 103 executes a process for switching the CN apparatus to which to connect to the local 5G CN apparatus 105 in response to receiving an instruction for switching the core network to the local 5G. In this processing, first the base station 103 transmits a message (NG RESET message) requesting disconnection of the connection to the public 5G CN apparatus 106 (step S620). Then, the public 5G CN apparatus 106 transmits a response message (NG RESET ACKNOWLEDGE message) to the request for disconnection from the base station 103 (step S621). As a result, the connection between the base station 103 and the public 5G CN apparatus 106 is disconnected. Also, the base station 103 transmits a message (NG SETUP REQUEST message) requesting establishment of a connection to the local 5G CN apparatus 105 (step S622). Then, the local 5G CN apparatus 105 transmits a response message (NG SETUP RESPONSE message) authorizing establishment of the connection to the base station 103 (step S623). When the base station 103 receives a message from the local 5G CN apparatus 105 in step S623, for example, it executes the connection setting with the local 5G CN apparatus 105 using the information included in the received message (step S624). Note that, at this time, the base station 103 sets parameters for wireless communication such as a communication method based on, for example, the received information. By this, a connection between the base station 103 and the local 5G CN apparatus 105 is established and the base station 103 completes preparations to communicate with the device A 101 on the local 5G. Note, since the content of the messages of step S620 to step S623 is as specified in the standard established by 3GPP, the description here is omitted.

After this, the device A 101 after having switched to the SIM corresponding to the local 5G executes a process for connecting to the base station 103 (step S626 and step S627). For example, after the switching of the SIMs, in response to having received a synchronization signal and system information from the base station 103 operating as a base station of the local 5G, the device A 101 actively starts a random access procedure with the base station 103 and establishes a connection. Note, the base station 103 may initiate a random access procedure to the device A 101 by transmitting a paging channel to the device A 101. The device B 102 also establishes a connection with the base station 103 in the same manner. By this, it is possible to perform data communication in the local 5G between the device A 101 and the device B 102 (step S628).

As described above, when the device A 101 needs to be connected to an external network that is different from the on-premises LAN for a predetermined reason such as maintenance of the device A 101, the base station 103 can switch the core network to which to connect. That is, the base station 103 can switch the core network to which to connect in response to reception of a predetermined message instructing switching of the core network from another apparatus such as the control apparatus 104. This makes it possible to flexibly switch the core network to which to connect the base station based on, for example, communication to be executed by the terminal even without a change to a property or the like of the terminal.

Note, the above-described process is not limited to a fifth-generation (5G) mobile communication system, and can be applied to a mobile communication system conforming to an existing standard such as Long Term Evolution (LTE) or a future standard.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-202899, filed Dec. 7, 2020, which is hereby incorporated by reference herein in its entirety.

What is claimed is:

1. A base station of a mobile communication system, comprising:
one or more processors; and
one or more memories that store computer-readable instructions, which cause, when executed by the one or more processors, the base station to:
receive an instruction for switching a core network based on a communication that a terminal connected to the base station is to perform;
transmit, in response to the received instruction, a connection release request message to a local 5G (fifth generation) core network to which the base station is currently connected;
receive, from the local 5G core network, a message response to the connection release request message;
transmit, to a public 5G core network, a connection request message after receiving the message response to the connection release request message;
receive, from the public 5G core network, a message response to the connection request message; and
connect to the public 5G core network,
wherein the public 5G core network is connected to a server device located in an external network, and the local 5G core network is not connected to any server device located in the external network.

2. The base station according to claim 1, wherein the received instruction includes information for specifying the public core network, and the base station transmits the connection request message based on the information.

3. The base station according to claim 2, wherein the received instruction includes an IMSI (International Mobile Subscriber Identity) and the information is included in the IMSI.

4. The base station according to claim 2, wherein the received instruction includes a PLMN (Public Land Mobile Network) number and the information is included in the PLMN number.

5. The base station according to claim 1, wherein in a case where communicating with another apparatus that cannot communicate while the terminal is connected to the local core network, the base station changes a core network to which to connect from the local core network to the public core network.

6. The base station according to claim 1, wherein the base station, based on the communication to be executed by the terminal ending while the base station is connected to the public core network, changes a core network to which to connect from the public core network to the local core network.

7. The base station according to claim 1, wherein the base station, based on a change of a core network to which to connect, changes a parameter for communication with the terminal.

8. A control method executed by a base station of a mobile communication system, the method comprising:
receiving an instruction for switching a core network based on a communication that a terminal connected to the base station is to perform;
transmitting, based on the received instruction, a connection release request message to a local 5G (fifth generation) core network to which the base station is currently connected;
receiving, from the local 5G core network, a message response to the connection release request message;
transmitting, to a public 5G core network, a connection request message after receiving the message response to the connection release request message;
receiving, from the public 5G core network, a message response to the connection request message; and
connecting to the public 5G core network,
wherein the public 5G core network is connected to a server device located in an external network, and the local 5G core network is not connected to any server device located in the external network.

9. A non-transitory computer-readable storage medium that stores a program configured to cause a computer provided in a base station of a mobile communication system to:
receive an instruction for switching a core network based on a communication that a terminal connected to the base station is to perform;
transmit, based on the received instruction, a connection release request message to a local 5G (fifth generation) core network to which the base station is currently connected;
receive, from the local 5G core network, a message response to the connection release request message;
transmit, to a public 5G core network, a connection request message after receiving the message response to the connection release request message;
receive, from the public 5G core network, a message response to the connection request message; and
connect to the public 5G core network,
wherein the public 5G core network is connected to a server device located in an external network, and the local 5G core network is not connected to any server device located in the external network.

10. A base station of a mobile communication system, comprising:
one or more processors; and
one or more memories that store computer-readable instructions, which cause, when executed by the one or more processors, the base station to:
receive an instruction for switching a core network based on a communication that a terminal connected to the base station is to perform;
transmit, in response to the received instruction, a connection release request message to a public 5G (fifth generation) core network to which the base station is currently connected;
receive, from the public 5G core network, a message response to the connection release request message;
transmit, to a local 5G core network, a connection request message after receiving the message response to the connection release request message;
receive, from the local 5G core network, a message response to the connection request message; and
connect to the local 5G core network,
wherein the public 5G core network is connected to a server device located in an external network, and the local 5G core network is not connected to any server device located in the external network.

\* \* \* \* \*